F. CAHA.
SICKLE BAR FOR MOWING MACHINES.
APPLICATION FILED APR. 12, 1917.

1,323,011.

Patented Nov. 25, 1919.

Inventor
F. Caha

Witnesses

UNITED STATES PATENT OFFICE.

FRANK CAHA, OF HEMINGFORD, NEBRASKA.

SICKLE-BAR FOR MOWING-MACHINES.

1,323,011.   Specification of Letters Patent.   Patented Nov. 25, 1919.

Application filed April 12, 1917. Serial No. 161,564.

*To all whom it may concern:*

Be it known that I, FRANK CAHA, a citizen of the United States, residing at Hemingford, in the county of Boxbutte, State of Nebraska, have invented a new and useful Sickle-Bar for Mowing-Machines; and I do hereby declare the following to be a full, clear, and exact description of the invention, such as will enable others skilled in the art to which it appertains to make and use the same.

The invention relates to sickle bars for mowing machines, being an improved device of this character.

One of the objects of the invention is to so position the sickle with reference to the stationary bar of the mowing machine that the sickle will be substantially parallel with the ground when the stationary bar is inclined to permit the machine to cut at its lowest point.

A further object of the invention is to provide means whereby the undue strain ordinarily imposed upon the sickle will be eliminated.

Other objects will appear in the detailed description which follows.

Should the drawings and specification vary to the extent of having the one set forth some structure that is not fully defined by the other, the right to such structure is claimed as though it had been fully treated by both.

A particular design has been adhered to in illustrating the invention to which, however, it is not to be restricted. The right is reserved to make any changes or alterations imposed by the demands of practice, provided such changes or alterations are compatible with the spirit of the appended claim.

The same numerals of reference designate the same parts in all of the several figures of the drawings, wherein.

Figure 1:
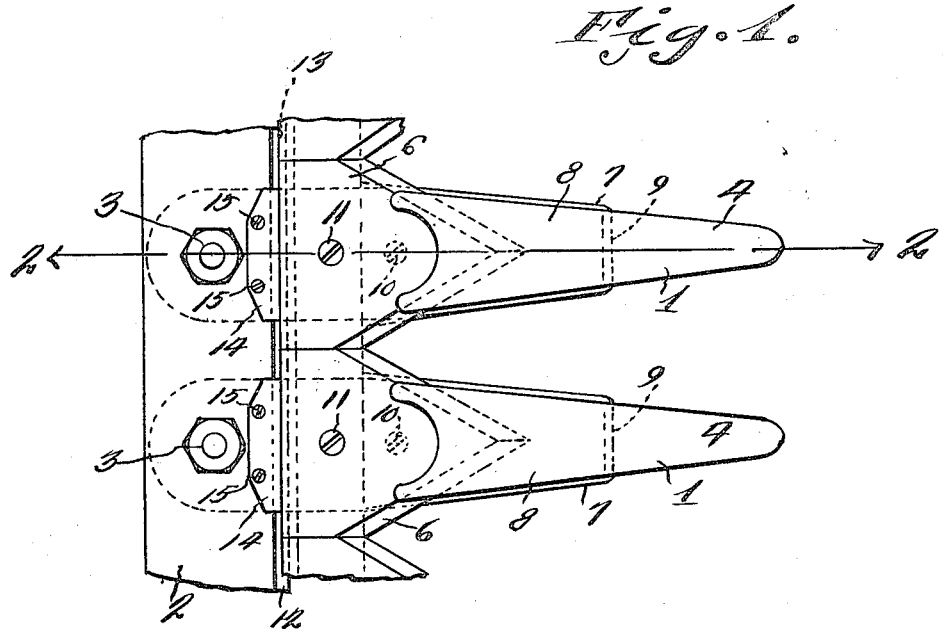
Figure 1 is a plan view of the invention.
Figure 2:
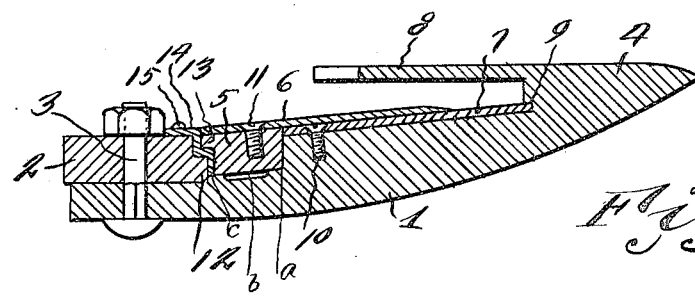
Fig. 2 is a section on the line 2—2 of Fig. 1.
Figure 3:
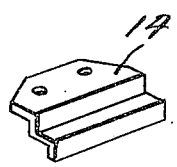
Fig. 3 is a perspective view of the improved wearing plate.

In the drawing, 1 represents a guard finger provided with a tapering extremity 4, a series of these guards being attached to the stationary finger bar 2 by means of the bolts 3. The stationary bar 2 and guards 1 are similar to the equivalent parts ordinarily used on mowing machines but have such modifications as the present invention imposes. The guards 1 are provided with suitable guide ways in which are mounted the reciprocating sickle bar 5 carrying the usual knife or sickle 6, this latter resting upon the upper face of the stationary knife plates 7 against the edges of which the beveled edges of the knives or sickles bear in the well known operation of shearing. The bottoms of the guide ways $a$ of the guard fingers are provided with recesses $b$, and adjacent said recesses $b$ are shoulders $c$, which engage the lower forward edge of the finger bar 2, thereby preventing displacement of the guard fingers. However, a certain amount of lubricant may collect in the recesses $b$.

The guards 1 are provided with rearwardly extending shields 8 which extend over the sickle 6 and provide an upper edge against which the grass is pressed by the action of the sickle.

The stationary knives 7, one of which is attached to each guard 1, are of slightly greater width than the guards and their attendant shields 8 and project beyond the guards on either side to permit the cutting operation to begin before the grass is brought into contact with the shields 8. The shields 8 together with the bodies of the guards 1 form slots, the bottoms of which are undercut to receive the ends 9 of the stationary blades 7, the other end of the blades 7 being secured to the guards 1 by screws 10. The faces of the guards 1 against which the stationary blades 7 lie are inclined upward with respect to the upper face of the stationary bar 2. The upper face of the reciprocating bar 5, to which the sickles 6 are secured by screws 11 or any other acceptable means, also has the same inclination as the stationary blades 7 giving to the sickles 6 a like inclination, so that they lie against the stationary blades 7.

An upper longitudinal edge of the stationary bar 2 is cut away leaving the lower projecting edge 12. Similarly a longitudinal edge of the reciprocating bar is cut away, leaving it with an upper projecting edge 13 adapted to overlie the projecting edge 12 of the stationary bar 2. Wear plates 14 in alinement with each guard 1 are attached to the stationary bar 2 by means of screws 15. These plates are substantially M-shaped in cross-section and intervene between the stationary bar 2 and the reciprocating bar 5, three legs of the plates forming bearing surfaces for the bar 5 and the fourth leg providing a flange by which each plate is attached to the bar 2. It is obvious that since the wear plates 14 are in alinement with the guards 1, and are spaced from each other, the sickle bar is spaced from the finger bar 2. The spaces between the wear plates and the recesses *b* may pocket a certain amount of lubricant, and even though some of the lubricant may spill onto the ground a certain amount of it becomes applied to the rear and bottom faces of the sickle bar.

The present invention is designed for application to the conventional mowing machine, the stationary bar 2 being designed for raising or lowering or angling so as to point the guards downward or upward. The guards 1 having a slight inclination upward from the horizontal plane of the bar 2 and the sickles 6 having the same inclination, the extreme cutting edges of the sickles are normally at a higher point than the rear edges thereof, thus relieving the extreme edges of the undue strain that would be imposed upon them, if they lie at the same level as the rear edge of the sickles. The tapering formation of the guards 1 imposes the bulk of the cutting operation on the extreme ends of the sickles and, in a plane parallel with the bar 2, the extreme ends of the sickles would in all likelihood be raised from the plates 7 by the accumulation of grass near their ends, resulting in choking the sickles and causing an undue strain on the means by which they are connected to the reciprocating bar. Ordinarily when the stationary bar is tilted to bring the sickles close to the ground, the guards and the sickles are angled downward tending to cut the grass off at an angle. The forward movement of the machine also tends to bend the grass down away from the machine, so that when it is cut off high stubble will remain. The strains imposed upon the extreme ends of the sickles when operating in a horizontal plane are offset by the overlapping edges of the reciprocating and stationary bars, the projecting edge 13 of the reciprocating bar resisting any strain tending to raise the forward edges of the sickles and depress the rear edges. The M-shaped wear plates 14 provide a bearing surface for both the projecting edge 13 and the side of the reciprocating bar 5 and may be easily replaced when worn to provide a snug slide bearing for the reciprocating bar.

What is claimed is:

The combination with the finger bar having its forward edge rabbeted, of a plurality of fingers having their rear ends secured to the under part of said bar, each finger adjacent where it is secured to said bar having a shoulder to engage the bar to prevent displacement of the finger, said fingers having transverse guide recesses adjoining said shoulders and alined with each other, the bottoms of the recesses having channels, a sickle bar operable transversely in said alined recesses and having its rear edge rabbeted correspondingly to the rabbet of the finger bar and overlying the same, sickle cutting blades secured to the sickle bar, and a plurality of spaced angular wear plates secured to the upper face of the finger bar and having their angular portions fitting between the overlying correspondingly shaped adjacent rabbeted edges of the finger and sickle bars, thereby spacing the sickle bar from the finger bar.

In testimony whereof I have signed my name to this specification in the presence of two subscribing witnesses.

FRANK CAHA.

Witnesses:
F. L. POTMESIL,
J. M. KUHN.